R. B. BENJAMIN.
REFLECTOR.
APPLICATION FILED FEB. 12, 1914.
1,238,483.
Patented Aug. 28, 1917.
3 SHEETS—SHEET 1.
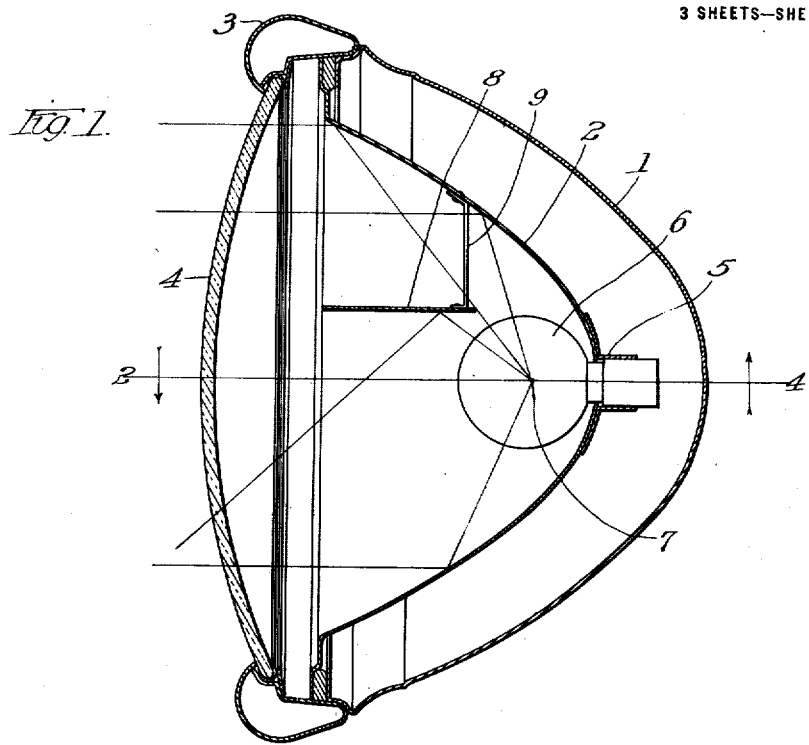
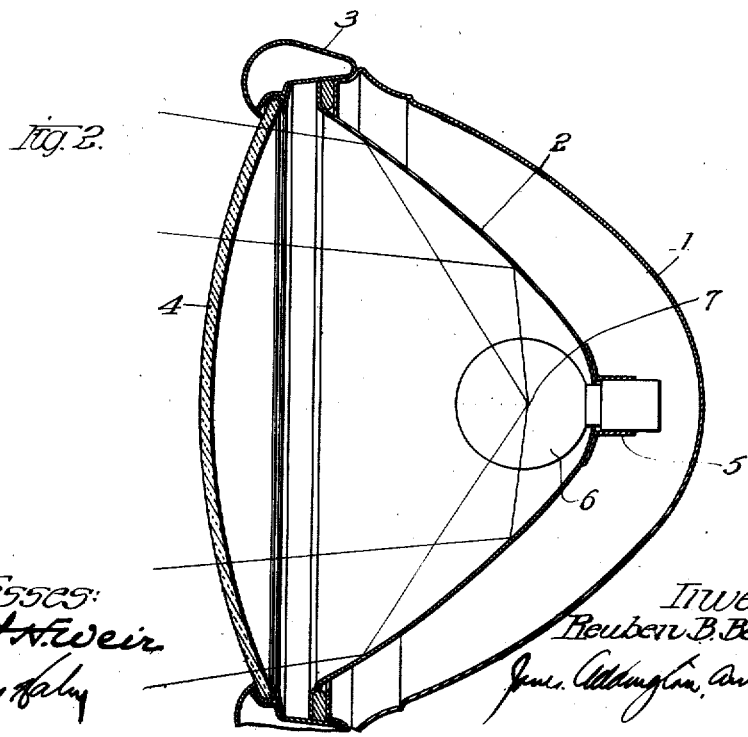

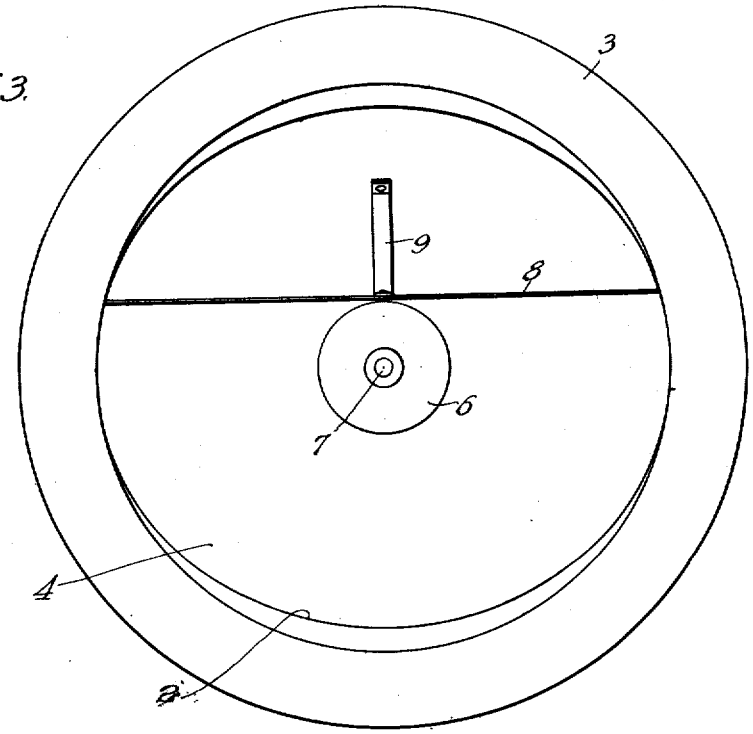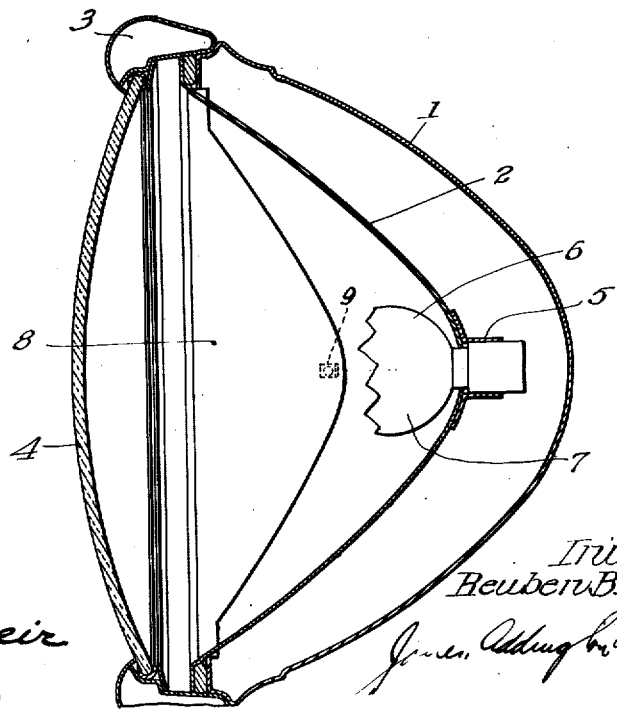

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

REFLECTOR.

1,238,483.  Specification of Letters Patent.  Patented Aug. 28, 1917.

Application filed February 12, 1914. Serial No. 818,292.

*To all whom it may concern:*

Be it known that I, REUBEN B. BENJAMIN, a citizen of the United States, residing at Chicago, in the county of Cook and State of Illinois, have invented new and useful Improvements in Reflectors, of which the following is a full, clear, concise, and exact description, reference being had to the accompanying drawing, forming a part of this specification.

My invention relates to improvements in reflectors, as particularly applicable to the reflectors of headlights for automobiles, motorcycles, and the like.

One of the objects of my invention is to provide a reflector which shall throw a beam of light wider in one direction than in the other, and the reflector which I have selected as being the preferred embodiment of my invention is particularly designed for throwing an elliptical beam, the reflector being so arranged that the ellipse is horizontal, so that the beam will have great width and comparatively small height.

Another object of my invention is to provide a reflector wherein predetermined of the direct rays from the illuminant projecting beyond the reflecting surface are either entirely intercepted or intercepted and redirected. This is particularly advantageous in automobiles. In the reflectors now in commercial use for automobile headlights certain of the direct rays emanating from the illuminant project forwardly and upwardly and are high enough to form a light screen in front of the driver through which the driver cannot readily see. This screen is particularly intensified on a foggy or damp night. These upwardly projecting direct rays also form a blinding glare in the eyes of pedestrians or drivers of cars approaching from an opposite direction, which prevents them from seeing, and serious accidents have been known to result from this blinding glare. By providing means for intercepting these rays the height of the beam of light is kept down to a point below the eye of the driver and to a point below the eyes of persons approaching the lights. By providing this intercepter with a reflecting surface on one side these upwardly projecting rays may be deflected downwardly so as to throw additional light on the road. For the purpose of disclosing my invention I have illustrated in the accompanying drawings an automobile headlight having a reflector embodying the same. In said drawings—

Figure 1 is a vertical sectional view of the headlight taken directly through the axis of the reflector;

Fig. 2 is a horizontal sectional view taken on the line 2 of Fig. 1 looking in the direction of the arrows;

Fig. 3 is a front elevation of the headlight; and

Fig. 4 is a sectional view taken on the line 4 of Fig. 1 looking in the direction of the arrows;

Figure 5:
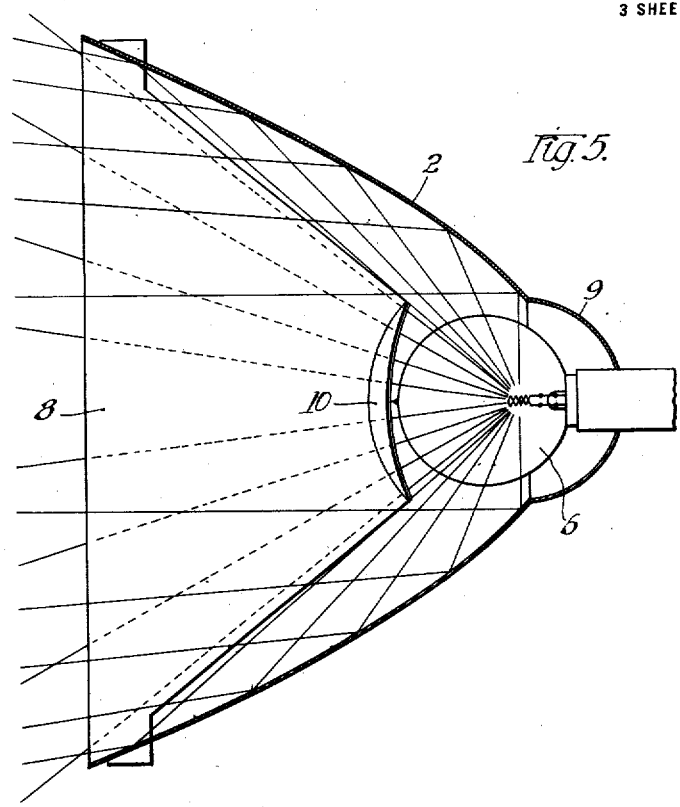
Fig. 5 is a horizontal sectional view of a modification of the reflector shown in Fig. 1.

In the embodiment illustrated in the accompanying drawings, the usual casing 1 is provided, having arranged therein a concave reflector 2 and having mounted on its front a cover 3 provided with a lens of glass 4. At the rear and in the center of the reflector is mounted a lamp socket 5 receiving the lamp 6. For the purpose of illustration it will be assumed that all of the light rays of the lamp emanate from the single point 7, which is the focus of the reflector. The reflector illustrated is designed for the headlight of an automobile, wherein it is particularly desirable that the top and bottom reflected rays of the lamp shall be reflected in planes parallel or substantially parallel with the horizontal plane passing through the focus of the reflector and wherein it is desirable that the reflected side rays be reflected in planes which, instead of being horizontal with, diverge from a vertical plane passing through the focus of the reflector. To accomplish this result I so form the reflector 2 that the arc thereof in the vertical plane through its axis is a parabolic curve, while the arc in horizontal plane through its axis is a distorted curve, more nearly resembling a hyperbola, the reflector being greater in width than in height. The intermediate portions of the reflector merge from the parabolic curve in vertical cross-section to the distorted curve in horizontal cross-section, so that the front edge of the reflector forms an ellipse. While I have described the curves as being parabolic and hyperbolic curves, these terms, it will be understood, are relative and have been used as they more nearly describe the arcs formed rather than with the intention that the terms shall be used in their most strict and limited sense.

By the above construction, as illustrated in the drawings, the top and bottom reflected rays will be reflected in planes parallel or substantially parallel with a horizontal plane passing through the focus of the reflector and the side rays will spread or diverge so that a comparatively narrow beam of light vertically and a comparatively wide beam of light horizontally will be projected. By this arrangement the height of the beam is kept down and the reflected rays of light prevented from forming a light screen in front of the eyes of the driver. Furthermore, by keeping the reflected rays down, as above described, the beam of light will not be so great as to cause a glare in the eyes of pedestrians and drivers approaching the car from the opposite direction.

To prevent the direct rays of the lamp from forming a light screen in the eyes of the driver and to prevent the beam from being so wide vertically as to form a glare in the eyes of approaching drivers and pedestrians, I provide an intercepter 8 for the upward direct rays of light from the lamp. This intercepter, however, is so shaped that while it intercepts the direct rays projecting beyond the edge of the reflector it does not interrupt the upward rays the angle of which is such that they strike the sides of the reflector. This intercepter, as shown in the accompanying drawings, consists of a flat plate secured in the reflector above the illuminant and having its rear edge arced so as to permit the upward rays which do not project beyond the edge of the reflector to strike the reflecting surface of the reflector. This plate is shown as having its front edge parallel or flush with the edge of the reflector, but if it is desired to intercept more of the direct rays the front edge may be projected forward as far as desired. The plate may be supported in any desired manner and I have shown the same as being supported from the front edge of the reflector and at its rear edge supported by a depending arm 9 secured to the upper portion of the reflector and secured to the rear edge of the plate. The under side of this plate is provided with a reflecting surface whereby the intercepted direct rays will be reflected downwardly to give additional light on the ground in front of the car. In event it is desired to direct the rays farther in front of the car this plate may be slightly tilted. Also, if it is desired to reflect certain of the direct rays which project toward the center of the road, an interrupter may be provided with a reflecting surface which would reflect these direct rays toward the side of the road.

Figure 6:
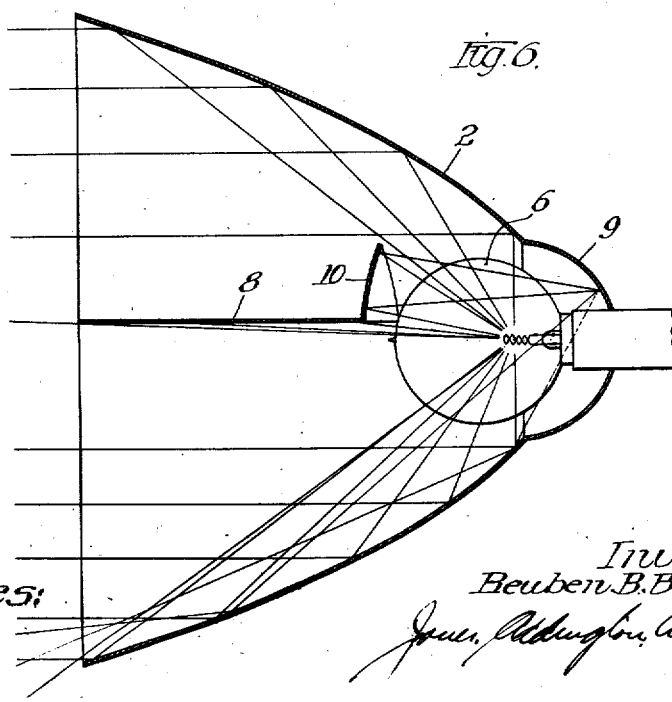
Fig. 6 is a vertical sectional view thereof.

In Figs. 5 and 6 I have illustrated a modification of the reflector disclosed in Figs. 1 to 4. In these figures the reflector 2 is provided with a spherical rearward extension 9, whereby the point from which the light rays emanate in the lamp may be brought farther back in the reflector. This spherical portion also serves an additional advantage which will more fully appear hereinafter. The intercepter 8 is lowered so that it is more nearly in a direct line with the center of the lamp 6, whereby the angle at which certain of the direct rays of light emanate from the lamp will be less and, therefore, the rays will be reflected in a more nearly horizontal direction and not at such a great angle, as shown in Fig. 1, as to be projected to the ground immediately in front of the lamp. By this arrangement a certain area in front of the lamp is more fully illuminated than when the intercepter is placed in the position illustrated in Fig. 1. The rear portion of the intercepter is turned upwardly to form a curved, crescent-shaped intercepting portion 10, which is substantially at right angles to the intercepter 8. The inner face of this portion 10 is provided with a reflecting surface and this intercepting portion is in the path of the direct rays from the lamp which would project above the portion 8 of the intercepter and the angle of which would be such that they would not strike the sides of the reflector. The direct rays emanating from the lamp and striking the reflecting surface of this intercepter 10 are redirected against the spherical reflecting surface and are then reflected so that they strike the sides of the reflector and are directed out toward the front of the reflector. This arrangement, it will be noted, projects certain of the light rays at such angles that they fill in a certain area which otherwise would be left more or less only partially illuminated. A portion of the direct rays of the light are projected substantially horizontally, as has been pointed out, and with the intercepter there would be a certain area wherein there would be no illuminating rays, or only a few illuminating rays, projected. By the above arrangement this area is filled in by the redirected rays, as heretofore pointed out.

I have illustrated and described the intercepter and specific form of reflector in a single combination, and while these two cooperate, it will be understood that the particular form of reflector may be used without the intercepter or that the intercepter may be used with other forms of reflectors than that shown. The combination above described, however, is particularly efficacious for use in headlights for automobiles, as it not only gives a wide beam of light horizontally, whereby the entire width of the road will be illuminated, but it gives a beam of light the upper edge of which is in a plane not higher than the top of the lamp, so that persons approaching the automobile will not be blinded by the glare of the light in their eyes.

It will thus be seen that the light from the illuminant is divided into three fields, the direct light, the light reflected by the auxiliary reflector 8, and the light reflected by the main reflector 2, and that these light fields are shaped and directed so as to give the most advantageous lighting for automobiles. The direct light is placed so as to illuminate strongly directly in front of and at the sides of the vehicle. The light reflected by the main reflector 2 is directed forwardly and laterally (but not upwardly or downwardly) because of the flattening of the reflector, and this gives a moderate illumination over a wide extent, both forwardly and laterally. The light reflected by the auxiliary reflector gives a fairly strong illumination somewhat farther forward and at the sides than the direct light and this auxiliary reflector prevents any of the light from being directed upwardly where it would dazzle the eyes of pedestrians and form a light screen in the eyes of the driver.

Having thus described my invention, what I claim as new and desire to secure by Letters Patent, is:—

A vehicle light comprising a concave reflector having its axis horizontal, means for supporting a source of light in said reflector, and a reflector mounted inside of said concave reflector immediately adjacent and in front of said source of light, said second reflector having a substantially horizontal edge lying adjacent a horizontal plane through said light center to permit the direct rays below said horizontal plane to pass beneath said reflector, and having a curved edge lying in the surface of a cone having its apex in said light center and the outline of its base defined by the front edge of said concave reflector, to intercept the direct light lying within said cone above the horizontal plane through said light and to permit the direct rays outside of said cone above said horizontal plane to fall on the reflector, said reflector having a reflecting surface on the side toward the source of light.

In witness whereof, I have hereunto subscribed my name in the presence of two witnesses.

REUBEN B. BENJAMIN.

Witnesses:
E. R. KING,
W. PERRY HAHN.